United States Patent [19]

Chi

[11] Patent Number: 4,934,839
[45] Date of Patent: Jun. 19, 1990

[54] JOURNAL FOR A FRAME FORK OF A BICYCLE

[76] Inventor: Yi-Chen Chi, No. 139-5 An Mei Rd., Mei Shan Tsun, Hou Li Hsiang, Taichung Hsien, Taiwan

[21] Appl. No.: 372,551

[22] Filed: Jun. 28, 1989

[51] Int. Cl.⁵ ............................................. F16C 33/72
[52] U.S. Cl. .................................. 384/477; 384/513; 384/515
[58] Field of Search ............... 384/477, 515, 513, 540, 384/537, 585

[56] References Cited

U.S. PATENT DOCUMENTS

| | | | |
|---|---|---|---|
| 2,866,672 | 12/1958 | Black | 384/515 |
| 3,157,442 | 11/1964 | Gaubatz | 384/540 |
| 4,545,691 | 10/1985 | Kastan et al. | 384/540 |
| 4,563,099 | 1/1986 | Brandenstein et al. | 384/515 |

Primary Examiner—Lenard A. Footland
Attorney, Agent, or Firm—Morton J. Rosenberg; David I. Klein

[57] ABSTRACT

A journal for a frame fork of a bicycle includes an upper cap and a lower cap with two or more balls rotatably received between the upper cap and the lower cap. The upper cap and the lower cap are cylindrical shaped. An inner thread is formed at an upper half of the upper cap and a track surface is formed in an inner surface of a lower half of the upper cap. An annular flange is formed on an outer surface of the lower cap and an inclined and curved surface is formed at an upper and outer edge of the lower cap such that the balls are receivable between the inclined surface of the lower cap and the track surface of the upper cap. A sealing ring is seated above the flange for preventing water or dust from entering the journal.

7 Claims, 4 Drawing Sheets

JOURNAL FOR A FRAME FORK OF A BICYCLE

FIELD OF THE INVENTION

The present invention relates to a journal, and more particularly to a journal for a frame fork of a bicycle.

BACKGROUND OF THE INVENTION

Journal for a frame fork of a bicycle is one of the most important part of a steering of the bicycle. Usually a bearing is used as the journal. But, generally the balls within the bearing expose to the air. This seriously affects the working life of the journal and the bicycle.

The present invention has arisen to mitigate and/or obviate the afore-described disadvantages of the conventional journals.

SUMMARY OF THE INVENTION

The primary object of the present invention is to provide a journal for a frame fork of a bicycle in which balls for the journal are well enclosed.

Another object of the present invention is to provide a journal for a frame fork of a bicycle which provides a safer and more stable construction for a steering of the bicycles.

The present invention seeks to provide a journal for a frame fork of a bicycle including an upper cap and a lower cap with two or more balls rotatably received between the upper cap and the lower cap. The upper cap and the lower cap are cylindrically shaped. An inner thread is formed at an upper half of the upper cap and a track surface is formed in an inner surface of a lower half of the upper cap. An annular flange is formed on an outer surface of the lower cap and an inclined and curved surface is formed at an upper and outer edge of the lower cap such that the balls are receivable between the inclined surface of the lower cap and the track surface of the upper cap. A sealing ring is seated above the flange for preventing water or dust from entering the journal.

Further objects and advantages of the present invention will become apparent from a careful reading of the detailed description provided hereinbelow, with appropriate reference to the accompanying drawings.

DETAILED DESCRIPTION OF THE INVENTION

Figure 1:
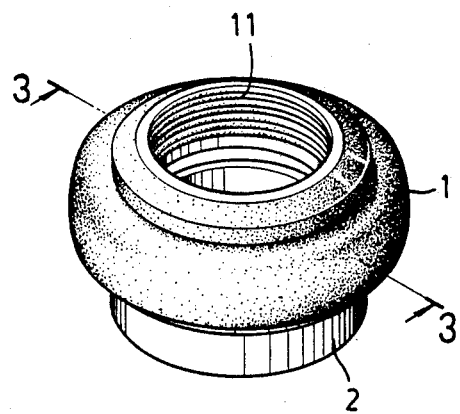
FIG. 1 is a perspective view of a journal in accordance with the present invention.
Figure 2:
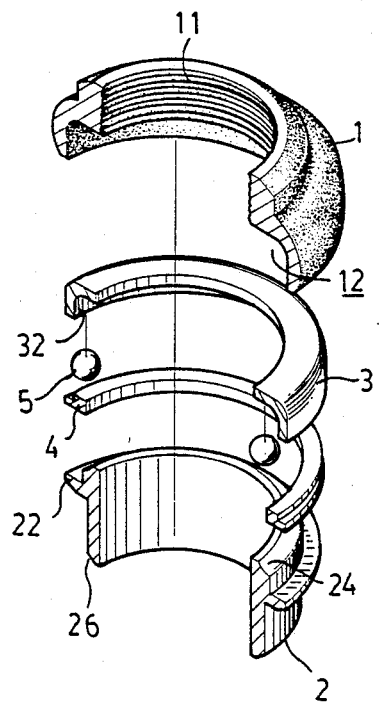
FIG. 2 is an exploded view of the journal of FIG. 1 in which half of the journal is cut away.

Referring to the drawings and initially to FIGS. 1 and 2, the journal for a frame fork of a bicycle in accordance with the present invention comprises generally an upper cap 1 and a lower cap 2 having an identical longitudinal axis with an annular track 3 provided therein.

Figure 3:
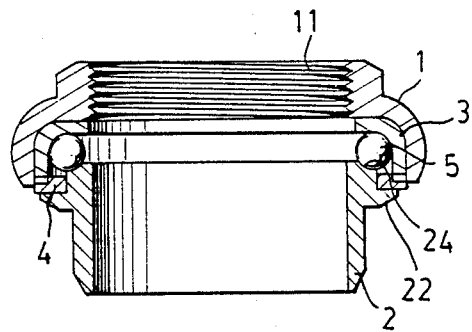
FIG. 3 is a cross sectional view of the journal taken along line III—III of FIG. 1.

Referring next to FIGS. 2 and 3, the shapes of the upper cap 1 and the lower cap 2 are substantially cylindrical. An inner thread 11 is formed in an upper end of the upper cap 1 and a recess 12 is formed in a lower end, which has a larger inner diameter as compared with an inner diameter of the threaded upper end, of the upper cap 1. The annular track 3 is substantially L-shaped with an annular rounded track surface 32. The annular track 3 is force-fitted into the recess 12 of the upper cap 1 with the track surface 32 facing downward. An annular flange 22 is formed on an outer surface of the lower cap 2 close to an upper end thereof and substantially extends outward. An inclined annular surface 24 is formed at an upper and outer edge of the lower cap 2. The inclination angle of the annular surface 24 is about 45 degrees with respect to a longitudinal axis of the caps 1 and 2. The surface 24 has a circular curve such that balls 5 are slidably receivable between the track surface 32 and the annular surface 24. A sealing ring 4 rests above the annular flange 22 of the lower cap 2 for sealing a gap between the upper cap 1 and the lower cap 2. The upper cap 1 and annular track 3 can rotate freely with respect to the lower cap 2 by the help of the balls 5.

Alternatively, the annular track 3 is not required if a track surface is formed in the inner and upper surface of the lower part of the upper cap 1 so that the balls 5 are receivable between the upper cap 1 and the lower cap 2. In this case, the track surface is ground and finished to provide a smooth surface.

Figure 4:
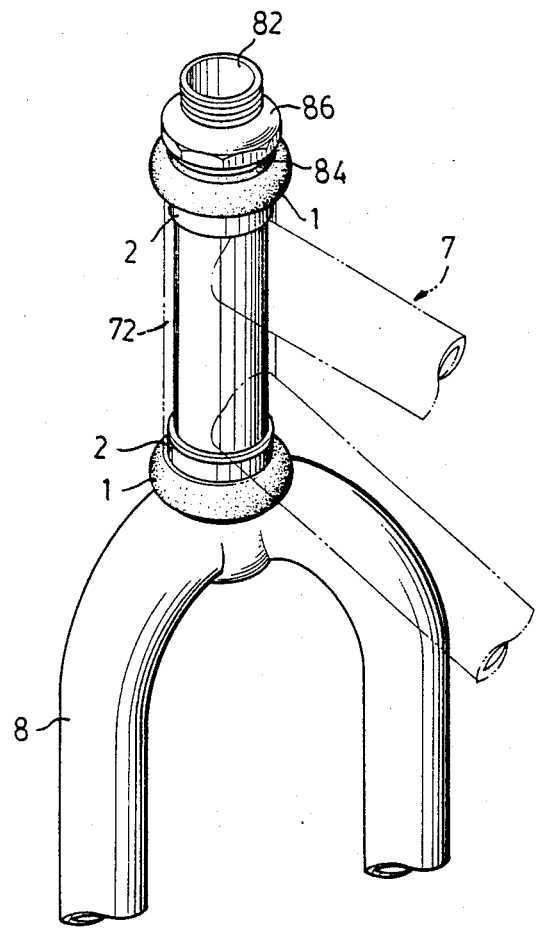
FIG. 4 is a partial perspective view of a frame fork of a bicycle embodying the present invention.

Referring next to FIG. 4, the lower caps 2 of two journals in accordance with the present invention are force-fitted onto both ends of a sleeve 72 at a front end of a frame body 7 (imaginary lines) of a bicycle. The lower cap 2 can be easily guided into the sleeve 72 by means of a tapered surface 26 formed at a lower and outer edge of the lower cap 2. The upper caps 1 are threadedly engaged with a front axle rod 82 of a frame fork 8 and respectively positioned by a washer 84 and a lock nut 86. The upper caps 1 are relatively fixed on the front axle rod 82 of the frame fork 8, and the lower caps 2 are relatively fixed on the sleeve 72 of the frame body 7 such that the frame fork 8 rotates freely with respect to the frame body 7 of the bicycle.

Accordingly, the present invention has the following advantages:

(a) The sealing ring 4 prevents water or dust from entering the journals in accordance with the present invention.

(b) The balls 5 are well enclosed within the journal and appropriately held by the curved surface 24 at the upper end of the lower cap 2.

(c) No bearings needed; therefore, the cost is remarkably reduced since the bearings are one of the most expensive parts of the bicycle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A journal for a frame fork of a bicycle comprising generally an upper cap and a lower cap with at least two balls rotatably received therebetween; said upper cap and said lower cap being substantially cylindrical shaped; an inner thread being formed at a substantially upper half of said upper cap and a track surface being formed in an inner surface of a lower half of said upper cap; an annular flange being formed on an outer surface of said lower cap; an inclined and curved surface being formed at an upper and outer edge of said lower cap such that said balls are receivable between said inclined surface of said lower cap and said track surface of said upper cap; and a sealing ring being seated above said flange for preventing water or dust from entering said journal.

2. A journal as set forth in claim 1, wherein an annular track with a track surface is further provided between said upper cap and said lower cap so that said balls are rotatably received between said inclined surface of said lower cap and said track surface of said annular track.

3. A journal as set forth in claim 2, wherein said annular track is substantially L-shaped.

4. A journal as set forth in claim 2, wherein said inclined surface and said track surface are (spherical) shaped.

5. A journal as set forth in claim 1, wherein an angle of said inclined surface of said lower cap is preferable 45 degrees with respect to a longitudinal axis of said upper and said lower caps.

6. A journal as set forth in claim 1, wherein a tapered surface is formed at a lower and outer edge of said lower cap.

7. A journal as set forth in claim 1, wherein said lower half of said upper cap has an inner diameter larger than an inner diameter of said upper half of said upper cap.

* * * * *